US011055267B2

(12) United States Patent
Pang

(10) Patent No.: US 11,055,267 B2
(45) Date of Patent: Jul. 6, 2021

(54) HANDLING TIME SERIES INDEX UPDATES AT INGESTION

(71) Applicant: VMware, Inc., Palo Alto, CA (US)

(72) Inventor: Clement Pang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 237 days.

(21) Appl. No.: 16/112,136

(22) Filed: Aug. 24, 2018

(65) Prior Publication Data

US 2020/0065407 A1 Feb. 27, 2020

(51) Int. Cl.

*G06F 16/22* (2019.01)
*G06F 16/23* (2019.01)
*G06F 16/2458* (2019.01)

(52) U.S. Cl.

CPC ...... *G06F 16/2228* (2019.01); *G06F 16/2379* (2019.01); *G06F 16/2471* (2019.01)

(58) Field of Classification Search

CPC ............... G06F 16/2365; G06F 16/273; G06F 16/2228; G06F 16/2379; G06F 16/2471
USPC .......................................................... 707/673
See application file for complete search history.

(56) References Cited

U.S. PATENT DOCUMENTS

2016/0092484 A1* 3/2016 Finkler ................. G06F 16/258 707/715
2016/0162524 A1* 6/2016 Bain .................. G06F 16/2228 707/741
2019/0026147 A1* 1/2019 Resch .................. G06F 3/0611

* cited by examiner

*Primary Examiner* — Robert W Beausoliel, Jr.
*Assistant Examiner* — Pedro J Santos

(57) ABSTRACT

In a computer-implemented method for proactive handling of an index update, a data point is received at an ingestion node of a time series data monitoring system. It is determined whether an update to a local index of the ingestion node is necessitated based on the data point and the local index. Provided the update to the local index is necessitated, an index entry corresponding to the data point in the local index is updated based on the data point. The index entry corresponding to the data point is marked with a volatile indicator, the volatile indicator indicating that receipt of an index update to a corresponding index entry at a durable index of the time series data monitoring system is unconfirmed. The index update to the durable index corresponding to the data point is initiated.

19 Claims, 8 Drawing Sheets

100

TIME SERIES DATA 110

INGESTION NODES 102a

102b

102n

QUERY NODES 104a

104b

104n

MESSAGING QUEUE 112

INDEX DATABASE 120

TIME SERIES DATABASE 130

HANDLING TIME SERIES INDEX UPDATES AT INGESTION

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. Conventional techniques, such as relational databases, have difficulty managing large quantities of data and have limited scalability. Moreover, as monitoring analytics of these large quantities of data often have real-time requirements, the deficiencies of reliance on relational databases become more pronounced.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
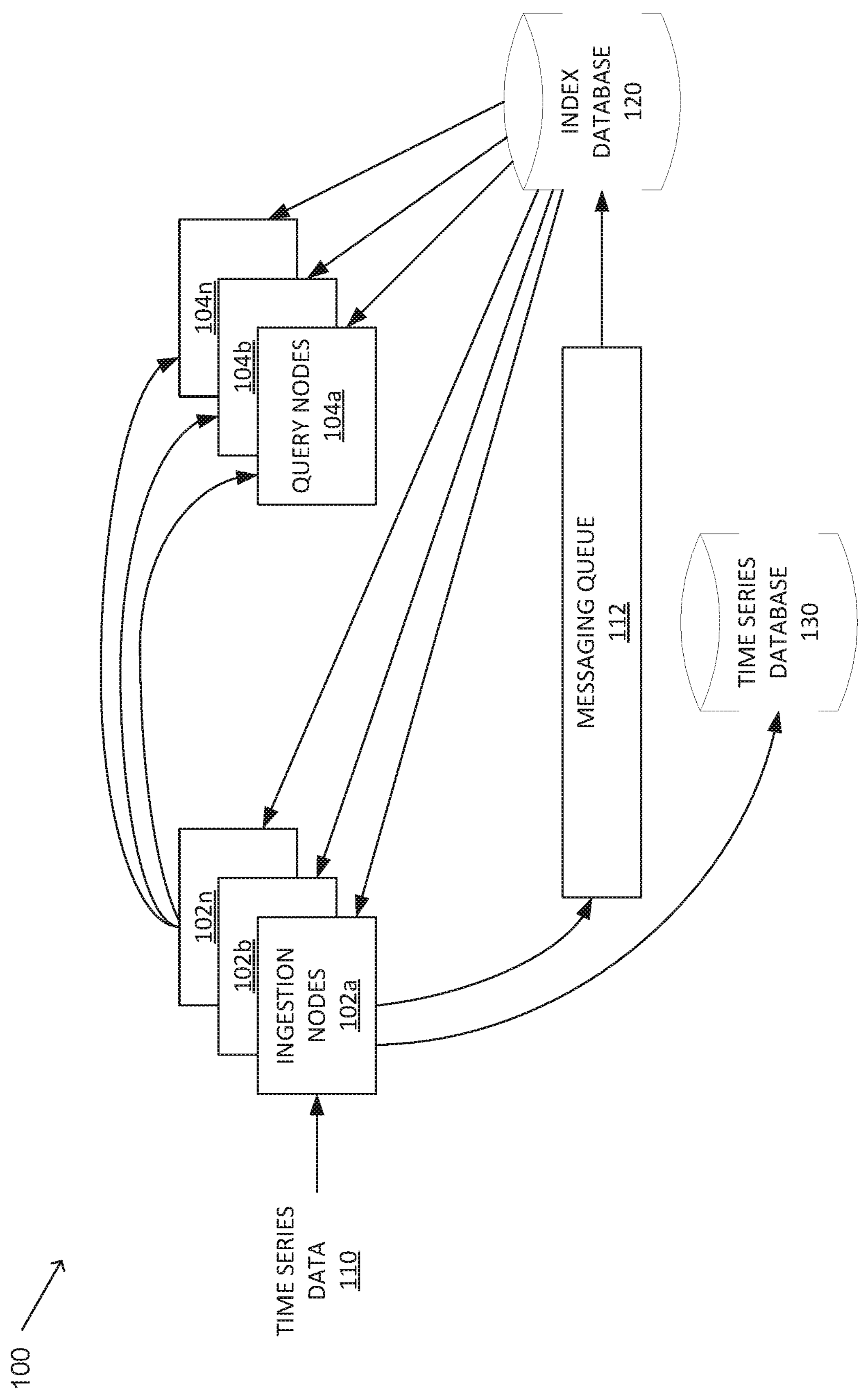
FIG. 1 is a block diagram illustrating a system for managing data including ingestion of the time series data and processing queries of the time series data, in accordance with embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "storing," "forwarding," "performing," "updating," "processing," "writing," "refreshing," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Example embodiments described herein improve the performance of computer systems by providing efficient handling of index updates on time series data. In various embodiments, a computer-implemented method for handling of an index update is provided. A data point is received at an ingestion node of a time series data monitoring system. It is determined whether an update to a local index of the ingestion node is necessitated based on the data point and the local index. Provided the update to the local index is necessitated, an index entry corresponding to the data point in the local index is updated based on the data point. The index entry corresponding to the data point is marked with a volatile indicator, the volatile indicator indicating that receipt of an index update to a corresponding index entry at a durable index of the time series data monitoring system is unconfirmed. The index update to the durable index corresponding to the data point is initiated.

In other embodiments, a computer-implemented method for handling of an index update requests is provided. An index update request for updating a local index of an ingestion node a time series data monitoring system is received. It is determined whether an update to the local index is necessitated based on the index update request and the local index. Provided the update to the local index is necessitated, an index entry identified by the index update request is updated in the local index. The index entry identified by the index update request is marked with a non-volatile indicator, the non-volatile indicator indicating that a durable index of the time series data monitoring system comprises an index entry matching the index entry identified by the index update request.

Time series data can provide powerful insights into the performance of a system. The monitoring and analysis of time series data can provide large amounts of data for analysis. Due to volume of time series data typically received, as well as the frequency of receipt of the time series data, analysis of the data can be challenging. For instance, ingestion of data points of time series data is processing intensive, and often subject to very large input/output (I/O) requirements on the durable index storing the indices for the time series data monitoring system. Embodiments described herein provide for improved handling of the ingestion and storage of data points by determining whether a data point requires forwarding to the durable index. Embodiments described herein also provide for improved handling of the ingestion and storage of data points by determining whether an update to the data point is required at the local index of an ingestion node from the durable index.

In some embodiments, ingestion nodes that ingest data points utilize multiple layers of caches to achieve the least amount of work needed to accomplish fast, durable persistence of data points as well as indices. An in-memory representation of key index structure (referred to herein as a local index of an ingestion node) are read from disk (referred to herein as the durable index) on-demand and kept alive in memory for the life of the node. When index updates are determined to be needed, messages are queued up in a messaging queue to decouple the index writes. Examples of messaging queues include, without limitation: RabbitMQ, Amazon Web Services Simple Queue Service (AWS SQS), etc. In some embodiments, messaging queues are used to decouple index writes from the writing of the time series points themselves so as to prevent head-of-line blocking.

However, since reading the index structure from the durable index may take time (e.g., some large index structures may take several minutes) and only a finite number of index reads can happen at a time, embodiments described herein provide an index entry marked as volatile, where a volatile indicator indicates that when an index write to the durable index has been sent to a messaging queue, that the actual index write will happen sometime in the future, and is unconfirmed at this point in time. Embodiments described herein also provide for marking an index entry as non-volatile, where a non-volatile indicator indicates that an index entry of the local index is confirmed as having been received at the durable index. In some embodiments, a volatile indicator and non-volatile indicator are represented by a least significant bit of a time stamp of the index entry in the local index. In some embodiments, an index entry is marked as volatile where the least significant bit is odd and an index entry is marked as non-volatile where the least significant but is even. It should be appreciated that the use of odd/even numbers can be reversed, and that other marking schemes or strategies may be used.

Described embodiments have the impact of not continuously queueing up index updates while the durable index structure is still being read from disk. This also has the impact that each ingestion node will only ever emit a single index update request and, in a cluster of N ingestion=nodes, only up to N index updates would be queued.

In other embodiments, where an index update request is received, e.g., on the dequeuing end of the messaging queue, a read-then-write operation on primary index structures, e.g., the last time that a particular time series was seen, to determine if additional index writes are necessary, e.g., index writes that support various functions such as query planning, autocomplete, etc.). Index reads are cached across all index writes to deduplicate them on each ingestion node (since a number of indices may contain similar writes, e.g., autocomplete). The impact of the described embodiments is that the N index updates that were queued before would be reduced back to the single attempt that is needed and M number of index update request will effectively yield less writes than had they been attempted in a stateless node that did not remember and coalesce writes across such requests.

Embodiments described herein provide for the updating of the local index of ingestion nodes without requiring a read of the durable index, while reducing the amount of messages including index entry updates to the durable index, thereby reducing the number of index writes to the durable index.

As presented above, time series data monitoring systems typically process very large amounts of data, such that it can be very difficult to process index updates necessitated by newly received data points. The efficient handling of index updates at the local index, where index entries in the local index can be marked volatile, and the handling of index update requests, where index entries in the local index can be marked non-volatile, improves the performance and throughput of index updates in the time series data monitoring system. For instance, embodiments described herein reduce the messages including index updates to the durable index, improving processing time an throughput.

The described embodiments speed up data point indexing and processing, thereby improving the performance of the overall system. Hence, the embodiments of the present invention greatly extend beyond conventional methods of handling index updates of a time series data monitoring system. Moreover, embodiments of the present invention amount to significantly more than merely using a computer to perform the index updates. Instead, embodiments of the present invention specifically recite a novel process, rooted in computer technology, for determining whether an update to the durable index is required and, if such an update is required, providing for marking index updates at a local index as volatile while the corresponding index update is sent to the durable index, to overcome a problem specifically arising in the realm of monitoring time series data and processing index updates on time series data within computer systems.

Example System for Managing Time Series Data

FIG. 1 is a block diagram illustrating an embodiment of a system 100 for managing time series data 110 including ingestion of the time series data 110 and processing queries of time series data 110. System 100 is a distributed system including multiple ingestion nodes 102*a* through 102*n* (collectively referred to herein as ingestion nodes 102) and multiple query nodes 104*a* through 104*n* (collectively referred to herein as query nodes 104). It should be appreciated that system 100 can include any number of ingestion nodes 102 and multiple query nodes 104. Ingestion nodes 102 and query nodes 104 can be distributed over a network of computing devices in many different configurations. For example, the respective ingestion nodes 102 and query nodes 104 can be implemented where individual nodes independently operate and perform separate ingestion or query operations. In some embodiments, multiple nodes may operate on a particular computing device (e.g., via virtualization), while performing independently of other nodes on the computing device. In other embodiment, many copies of the service (e.g., ingestion or query) are distributed across multiple nodes (e.g., for purposes of reliability and scalability).

Time series data 110 is received at at least one ingestion node 102*a* through 102*n*. In some embodiments, time series data includes a numerical measurement of a system or activity that can be collected and stored as a metric (also referred to as a "stream"). For example, one type of metric is a CPU load measured over time. Other examples include, service uptime, memory usage, etc. It should be appreciated that metrics can be collected for any type of measurable performance of a system or activity. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. It should be appreciated that the preceding examples are non-limiting, and that metrics analysis can be utilized in many different types of use cases and applications.

In accordance with some embodiments, a data point in a stream (e.g., in a metric) includes a name, a source, a value, and a time stamp. Optionally, a data point can include one or more tags (e.g., point tags). For example, a data point for a metric may include:

- A name—the name of the metric (e.g., CPU_idle, service.uptime)
- A source—the name of an application, host, container, instance, or other entity generating the metric (e.g., web_server_1, app1, app2)
- A value—the value of the metric (e.g., 99% idle, 1000, 2000)
- A timestamp—the timestamp of the metric (e.g., 1418436586000)
- One or more point tags (optional)—custom metadata associated with the metric (e.g., location=las_vegas, environment=prod)

Ingestion nodes 102 are configured to process received data points of time series data 110 for persistence and indexing. In some embodiments, ingestion nodes 102 forward the data points of time series data 110 to time series database 130 for storage. In some embodiments, the data points of time series data 110 are transmitted to an intermediate buffer for handling the storage of the data points at time series database 130. In one embodiment, time series database 130 can store and output time series data, e.g., TS1, TS2, TS3, etc. The data can include times series data, which may be discrete or continuous. For example, the data can include live data fed to a discrete stream, e.g., for a standing query. Continuous sources can include analog output representing a value as a function of time. With respect to processing operations, continuous data may be time sensitive, e.g., reacting to a declared time at which a unit of stream processing is attempted, or a constant, e.g., a 5V signal. Discrete streams can be provided to the processing operations in timestamp order. It should be appreciated that the time series data may be queried in real-time (e.g., by accessing the live data stream) or offline processing (e.g., by accessing the stored time series data).

Ingestion nodes 102 are also configured to process the data points of time series data 110 for determining updates to the indices for locating the data points in time series database 130. During the ingestion of data points, ingestion nodes 102 detect the index updates that are needed. Index updates are communicated to messaging queue 112 which will process the index updates (e.g., sequentially) and ultimately update the indices located in index database 120. Index database 120 maintains indices of the data points of time series database 130. Index database 120 is one embodiment of a durable index, where a durable index is a persistent representation of the indices of the time series data monitoring system.

Query nodes 104 are configured receive and process queries for searching the time series data. In order to plan and perform the searches, query nodes 104 utilize locally stored index structures that identify the location of the data points in time series database 130. In some embodiments, the index structures are stored in memory of each query node 104. The index structures stored in each query node 104 are typically refreshed according to a schedule (e.g., periodically or sporadically), but at a much slower rate than the rate at which data points are received and index updates are generated.

Ingestion nodes 102 are configured to receive the data points of time series data 110 and to determine whether an update to a local index of the ingestion node 102 receiving the data point is necessitated based on the data point and the local index. The local index of an ingestion node is subject to scheduled updating from the index database 120. In one embodiment, an ingestion node 102 receiving a data point checks the local index (e.g., in-memory index) for an index entry corresponding to the data point. A determination is first made as to whether the local index includes an index entry corresponding to the data point.

If the local index does not include an index entry corresponding to the data point, an index entry corresponding to the data point is created and inserted into the local index. The index entry is marked as volatile, indicating that the index entry is placed in messaging queue 112 for updating index database 120 but that receipt of the index update has yet be confirmed at index database 120. An index update of index database 120 is triggered via placing the index update into messaging queue 112. In one embodiment, the index update is broadcast to index database 120.

If the local index does include an index entry corresponding to the data point, it is determined whether the index entry is marked as volatile (e.g., sent to a durable database without confirmed receipt at the durable database) or non-volatile (e.g., the index entry is confirmed as consistent with the durable database). If the local index includes an index entry corresponding to the data point that is marked as volatile, the time of the most recent prior local index update is determined and compared to the time of the receipt of the data point. In one embodiment, the time of receipt of the data point is comprised within a timestamp of the data point. If the most recent prior local index update is not before the receipt time of the data point, no action is taken, as an update to the local index and to the durable index is not required. If the most recent prior local index update is before the receipt time of the data point, the index entry corresponding to the data point is replaced in the local index with an index entry based on the data point. The index entry maintains the indicator indicating the index entry as volatile. An index update of index database 120 is triggered via placing the index update into messaging queue 112.

If the local index includes an index entry corresponding to the data point that is marked as non-volatile (e.g., not marked as volatile), the time of the next scheduled local index update is determined and compared to the time of the receipt of the data point. In one embodiment, the time of receipt of the data point is comprised within a timestamp of the data point. If the next scheduled local index update is not before the receipt time of the data point, no action is taken, as an update to the local index and to the durable index is not required. If the next scheduled local index update is before the receipt time of the data point, the index entry corresponding to the data point is replaced in the local index with an index entry based on the data point. The index entry is marked as volatile, indicating that the index entry is placed in messaging queue 112 for updating index database 120 but that receipt of the index update has yet be confirmed at index database 120. An index update of index database 120 is triggered via placing the index update into messaging queue 112.

In accordance with other embodiments, an index update request is received for updating the local index of an ingestion node according to the corresponding index entry from the durable index (e.g., index database 120). A determination is first made as to whether the local index includes an index entry corresponding to the index update request.

If the local index does not include an index entry corresponding to the index update request, the index entry corresponding to the index update request is read from index database 120 (e.g., as a single row read). The time of the next scheduled local index update is determined and compared to the time of the index update request. In one embodiment, the time of receipt of the index update request is comprised within a timestamp of the index update request. If the next scheduled local index update is not before the receipt time of the index update request, no action is taken, as an update to the local index is not required. If the next scheduled local index update is before the receipt time of the index update request, the index entry corresponding to the index update request is replaced in the local index with the index entry corresponding to the index update request. The index entry is marked as non-volatile, as the index entry was read from a durable index.

If the local index does include an index entry corresponding to the index update request, it is determined whether the index entry is marked as volatile or non-volatile. If the local index includes an index entry corresponding to the index update request that is marked as volatile, the index entry corresponding to the index update request is read from index database 120 (e.g., as a single row read). The time of the next scheduled local index update is determined and compared to the time of the index update request. In one embodiment, the time of receipt of the index update request is comprised within a timestamp of the index update request. If the next scheduled local index update is not before the receipt time of the index update request, no action is taken, as an update to the local index is not required. If the next scheduled local index update is before the receipt time of the index update request, the index entry corresponding to the index update request is replaced in the local index with the index entry corresponding to the index update request and the timestamp of the index entry marked as volatile is used in place of the timestamp of the index entry read from index database 120. The index entry is marked as non-volatile, as the index entry was read from a durable index.

If the local index includes an index entry corresponding to the index update request that is marked as non-volatile (e.g., not marked as volatile), the index entry corresponding to the index update request is read from index database 120 (e.g., as a single row read). The time of the next scheduled local index update is determined and compared to the time of the index update request. In one embodiment, the time of receipt of the index update request is comprised within a timestamp of the index update request. If the next scheduled local index update is before the receipt time of the index update request, no action is taken, as an update to the local index is not required. If the next scheduled local index update is not before the receipt time of the index update request, the index entry corresponding to the index update request is replaced in the local index with the index entry corresponding to the index update request. The index entry is marked as non-volatile, as the index entry was read from a durable index.

Furthermore, in some embodiments, responsive to an index entry being marked as non-volatile, a multicast of the index entry is sent to other ingestion nodes of the time series data monitoring system for updating the local index of those ingestion nodes. This results in improving the synchronization of local indices across multiple ingestion nodes, and reduces the amount of messages in the messaging queue, as well as reducing the processing of index update requests.

Figure 2:
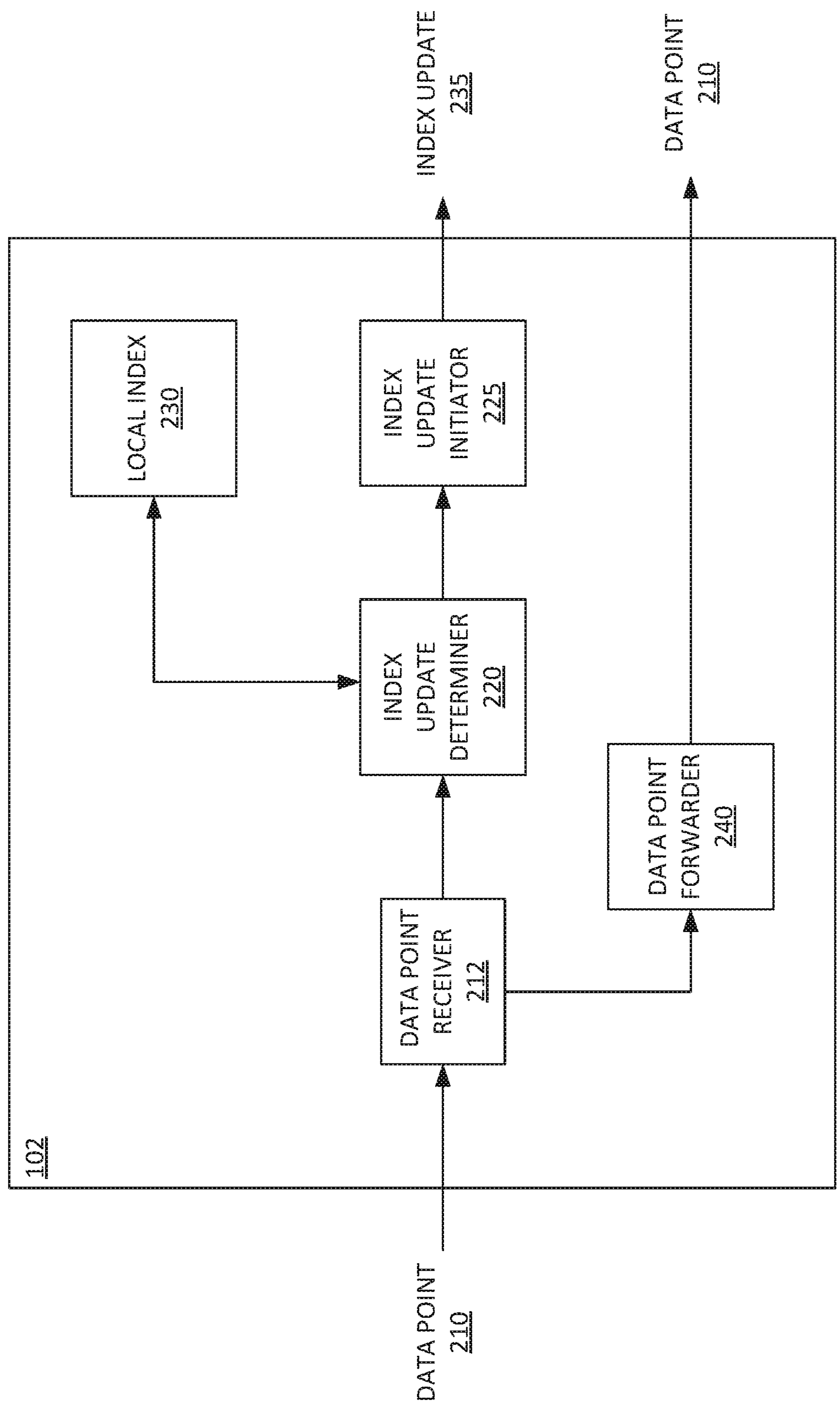
FIG. 2 is a block diagram illustrating an example ingestion node for ingesting data points of time series data and processing updates to a local index, in accordance with embodiments.

FIG. 2 is a block diagram illustrating an embodiment of an example ingestion node 202 (e.g., one of ingestion nodes 102*a* through 102*n* of FIG. 1) for ingesting a data point 210 of time series data (e.g., time series data 110) and processing updates to local index 230. In one embodiment, ingestion node 202 receives data point 210, determines whether an index update to local index 230 and a durable index (e.g., index database 120) is needed, and initiates the updating of local index 230 and a durable index. Ingestion node 202 includes data point receiver 212, index update determiner 220, index update initiator 225, local index 230, and data point forwarder 240. It should be appreciated that ingestion node 202 is one node of a plurality of ingestion nodes of a distributed system for managing time series data (e.g., system 100).

In the example shown in FIG. 2, a data point 210 is received. In one embodiment, time series data including data point 210 is received from an application or system. Data point 210 is received at data point receiver 212. Data point 210 is collected and sorted into a plurality of indices to facilitate retrieval of the source time series data (e.g., which data stream to access or which data store to access). Data point receiver 212 is configured to generate an index entry corresponding to the data point 210 and forward the index entry to index update determiner 220. In some embodiments, data point receiver 212 is also configured to forward data point 210 to data point forwarder 240. Data point forwarder 240 is configured to forward the data point 210 to durable storage (e.g., time series database 130 of FIG. 1).

Index update determiner 220 receives the index entry corresponding to data point 210 and determines whether an update to local index 230 is necessitated based on data point 210 (e.g., the index entry corresponding to data point 210) and local index 230. In some embodiments, the determination is based on a time of receipt of data point 210 (e.g., indicated by a timestamp) and the time of a most recent update of local index 230 from the durable index or a next scheduled update of local index 230 from the durable index.

In one embodiment, index update determiner 220 first determines whether local index 230 includes an index entry corresponding to data point 210. If local index 230 does not include an index entry corresponding to data point 210, an index entry corresponding to data point 210 is created and inserted into local index 230. Index update determiner 220 marks the index entry as volatile, indicating that the index entry is placed in a messaging queue (e.g., messaging queue 112) for updating the durable database but that receipt of the index update has yet be confirmed at the durable database. The index update is forwarded to index update initiator 225 that is configured to communicate index update 235 to the durable index, thereby triggering the update of the corresponding index entry in the durable database, via placing index update 235 into a messaging queue.

If index update determiner 220 determines that local index 230 does include an index entry corresponding to data point 210, index update determiner 220 then determines whether the index entry is marked as volatile (e.g., sent to a durable database without confirmed receipt at the durable database) or non-volatile (e.g., the index entry is confirmed as consistent with the durable database) in local index 230. If local index 230 includes an index entry corresponding to data point 210 that is marked as volatile, index update determiner 220 determines a time of the most recent prior local index update and compares the time of the most recent prior local index update to the time of the receipt of data point 210 (e.g., as indicated within the timestamp of data point 210). If the most recent prior local index update is not before the receipt time of data point 210, no action is taken, as an update to local index 230 and to the durable index is not required. If the most recent prior local index update is before the receipt time of data point 210, the index entry corresponding to data point 210 is replaced in local index 230 with an index entry based on data point 210. The index entry maintains the indicator indicating the index entry as volatile. The index update is forwarded to index update initiator 225 that is configured to communicate index update 235 to the durable index, thereby triggering the update of the corresponding index entry in the durable database, via placing index update 235 into a messaging queue.

If local index 230 includes an index entry corresponding to data point 210 that is marked as non-volatile (e.g., not marked as volatile), index update determiner 220 determines the time of the next scheduled local index update and compares the time of the next scheduled local index update to the time of the receipt of data point 210 (e.g., as indicated within the timestamp of data point 210). If the next scheduled local index update is not before the receipt time of data point 210, no action is taken, as an update to local index 230 and to the durable index is not required. If the next scheduled local index update is before the receipt time of data point 210, the index entry corresponding to data point 210 is replaced in local index 230 with an index entry based on data point 210. The index entry is marked as volatile. The index update is forwarded to index update initiator 225 that is configured to communicate index update 235 to the durable index, thereby triggering the update of the corresponding index entry in the durable database, via placing index update 235 into a messaging queue.

Figure 3:
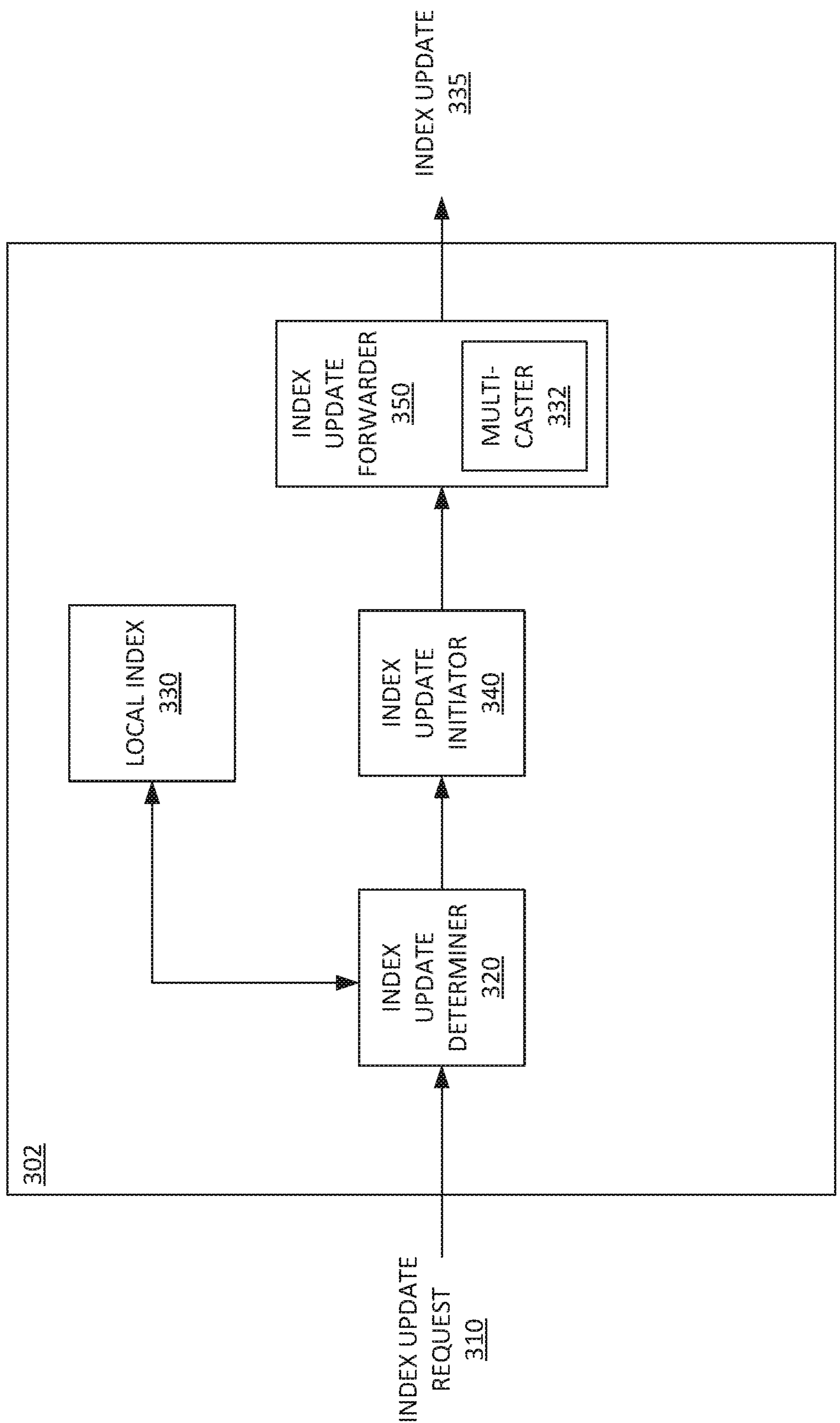
FIG. 3 is a block diagram illustrating an example ingestion node for processing updates to a local index according to an index update request, in accordance with embodiments.

FIG. 3 is a block diagram illustrating an embodiment of an example ingestion node 302 (e.g., one of ingestion nodes 102*a* through 102*n* of FIG. 1) for processing updates to a local index 330 according to an index update request 310, in accordance with embodiments. In one embodiment, ingestion node 102 receives index update request 310, determines whether an index update to local index 330 is needed, and initiates the updating of local index 330. Ingestion node 102 includes index update determiner 320, index update initiator 340, local index 330, and index update forwarder 240. It should be appreciated that ingestion node 102 is one node of a plurality of ingestion nodes of a distributed system for managing time series data (e.g., system 100). It should further be appreciated an ingestion node can include the components of ingestion 202 of FIG. 2 and ingestion node 302, and that some components (e.g., index update determiner 320 and index update determiner 320) can perform the same operations. Moreover, it should be appreciated that local index 330 and local index 330 can refer to the same instance of a local index. The components and operations of ingestion node 202 and ingestion node 302 are separated herein for purposes of clarity, and so as to not obfuscate particular embodiments.

In the example shown in FIG. 3, an index update request 310 is received. In one embodiment, index update request 310 is received from a durable index (e.g., index database 120) via a messaging queue (e.g., messaging queue 112). Index update determiner 320 receives index update request 310 and determines whether an update to local index 330 is necessitated based on index update request 310 (e.g., the index entry corresponding to index update request 310) and local index 330. In some embodiments, the determination is based on a time of receipt of index update request 310 (e.g., indicated by a timestamp) and the time of a most recent update of local index 330 from the durable index or a next scheduled update of local index 330 from the durable index.

In one embodiment, index update determiner 320 first determines whether local index 330 includes an index entry corresponding to index update request 310. If local index 330 does not include an index entry corresponding to index update request 310, the index entry corresponding to index update request 310 is read from the durable index (e.g., as a single row read). The time of the next scheduled local index update is determined and compared to the time of index update request 310 (e.g., as indicated within a timestamp of index update request 310). If the next scheduled local index update is not before the receipt time of index update request 310, no action is taken, as an update to local index 330 is not required. If the next scheduled local index update is before the receipt time of index update request 310, the index entry corresponding to index update request 310 is replaced in local index 330 with the index entry corresponding to index update request 310. The index entry is marked as non-volatile, as the index entry was read from a durable index.

If index update determiner 320 determines that local index 330 does include an index entry corresponding to index update request 310, index update determiner 320 then determines whether the index entry is marked as volatile (e.g., sent to a durable database without confirmed receipt at the durable database) or non-volatile (e.g., the index entry is confirmed as consistent with the durable database) in local index 330. If local index 330 includes an index entry corresponding to index update request 310 that is marked as volatile, the index entry corresponding to index update request 310 is read from the durable index (e.g., as a single row read). The time of the next scheduled local index update is determined and compared to the time of index update request 310 (e.g., as indicated within a timestamp of index update request 310). If the next scheduled local index update is not before the receipt time of index update request 310, no action is taken, as an update to local index 330 is not required. If the next scheduled local index update is before the receipt time of index update request 310, the index entry corresponding to index update request 310 is replaced in local index 330 with the index entry corresponding to index update request 310 and the timestamp of the index entry marked as volatile is used in place of the timestamp of the index entry read from index database 120. The index entry is marked as non-volatile, as the index entry was read from a durable index.

If local index 330 includes an index entry corresponding to index update request 310 that is marked as non-volatile (e.g., not marked as volatile), the index entry corresponding to index update request 310 is read from the durable index (e.g., as a single row read). The time of the next scheduled local index update is determined and compared to the time of index update request 310 (e.g., as indicated within a timestamp of index update request 310). If the next scheduled local index update is before the receipt time of index update request 310, no action is taken, as an update to the local index is not required. If the next scheduled local index update is not before the receipt time of index update request 310, the index entry corresponding to index update request 310 is replaced in local index 330 with the index entry corresponding to index update request 310. The index entry is marked as non-volatile, as the index entry was read from a durable index.

Furthermore, in some embodiments, responsive to an index entry being marked as non-volatile, index update forwarder 350 is configured to forward index update 335 to other ingestion nodes of the time series data monitoring system for updating the local index of those ingestion nodes. In one embodiment, index update forwarder 350 includes multicaster 332 for performing the multicasting of index update 335 to a plurality of ingestion nodes. This results in improving the synchronization of local indices across multiple ingestion nodes, and reduces the amount of messages in the messaging queue, as well as reducing the processing of index update requests.

Hence, the embodiments of the present invention greatly extend beyond conventional methods of handling index updates of a time series data monitoring system. For instance, the local index of new ingestion nodes is populated by the time series data stream and the index updates, converging towards non-volatility over time. Moreover, fewer scans of the durable index are required, reducing the number of I/O operations, thereby improving processing and throughput. By not taking action if no update is required, the described embodiments reduce the impact on processing and throughput of index updates on the messaging queue and a durable index. Furthermore, even where an index update request is handled by different nodes, the read-then-write operation described above results in the skipping of write operations and marks the index entry as non-volatile, thereby suppressing future messages to the messaging queue.

Accordingly, embodiments of the present invention amount to significantly more than merely using a computer to perform the index updates. Instead, embodiments of the present invention specifically recite a novel process, rooted in computer technology, for determining whether an update to the durable index is required and, if such an update is required, providing for marking index updates at a local index as volatile while the corresponding index update is sent to the durable index, to overcome a problem specifically arising in the realm of monitoring time series data and processing index updates on time series data within computer systems.

Figure 4:
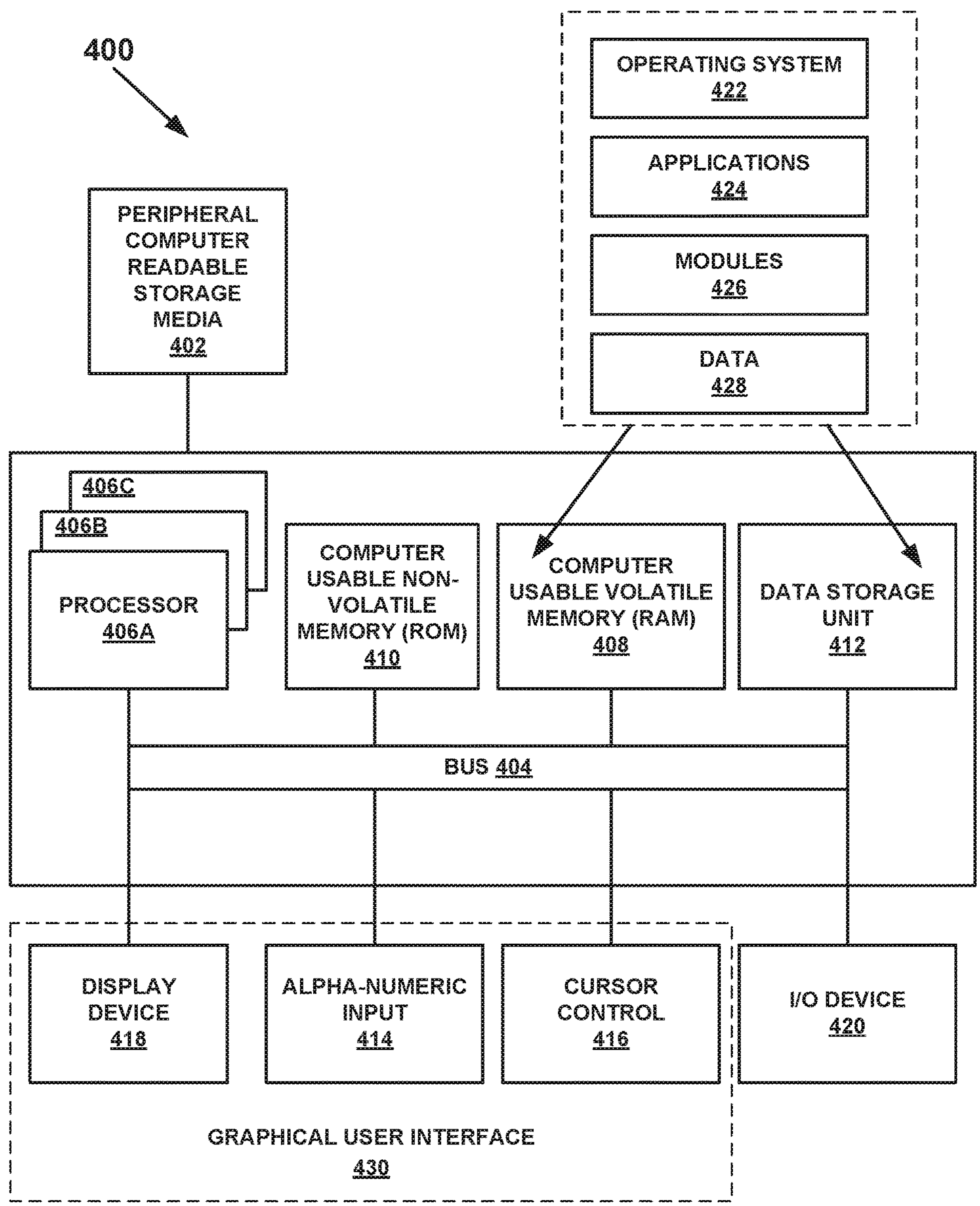
FIG. 4 is a block diagram of an example computer system upon which embodiments of the present invention can be implemented.

FIG. 4 is a block diagram of an example computer system 400 upon which embodiments of the present invention can be implemented. FIG. 4 illustrates one example of a type of computer system 400 (e.g., a computer system) that can be used in accordance with or to implement various embodiments which are discussed herein.

It is appreciated that computer system 400 of FIG. 4 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, standalone computer systems, media centers, handheld computer systems, multi-media devices, and the like. In some embodiments, computer system 400 of FIG. 4 is well adapted to having peripheral tangible computer-readable storage media 402 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 400 of FIG. 4 includes an address/data bus 404 for communicating information, and a processor 406A coupled with bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled with bus 404 for storing information and instructions for processors 406A, 406B, and 406C. Computer system 400 also includes computer usable non-volatile memory 410, e.g., read only memory (ROM), coupled with bus 404 for storing static information and instructions for processors 406A, 406B, and 406C. Also present in computer system 400 is a data storage unit 412 (e.g., a magnetic or optical disc and disc drive) coupled with bus 404 for storing information and instructions. Computer system 400 also includes an alphanumeric input device 414 including alphanumeric and function keys coupled with bus 404 for communicating information and command selections to processor 406A or processors 406A, 406B, and 406C. Computer system 400 also includes an cursor control device 416 coupled with bus 404 for communicating user input information and command selections to processor 406A or processors 406A, 406B, and 406C. In one embodiment, computer system 400 also includes a display device 418 coupled with bus 404 for displaying information.

Referring still to FIG. 4, display device 418 of FIG. 4 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, touch screen, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. Computer system 400 is also well suited to having a cursor directed by other means such as, for example, voice commands. In various embodiments, alphanumeric input device 414, cursor control device 416, and display device 418, or any combination thereof (e.g., user interface selection devices), may collectively operate to provide a graphical user interface (GUI) 430 under the direction of a processor (e.g., processor 406A or processors 406A, 406B, and 406C). GUI 430 allows user to interact with computer system 400 through graphical representations presented on display device 418 by interacting with alphanumeric input device 414 and/or cursor control device 416.

Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet. In one embodiment, I/O device 420 includes a transmitter. Computer system 400 may communicate with a network by transmitting data via I/O device 420.

Referring still to FIG. 4, various other components are depicted for computer system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Methods of Operation

The following discussion sets forth in detail the operation of some example methods of operation of embodiments. With reference to FIGS. 5 through 8, flow diagrams 500, 600, 700, and 800 illustrate example procedures used by various embodiments. The flow diagrams 500, 600, 700, and 800 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 400). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 500, 600, 700, and 800 may be performed in an order different than presented and/or not all of the procedures described in flow diagrams 500, 600, 700, and 800 may be performed. It is further appreciated that procedures described in flow diagrams 500, 600, 700, and 800 may be implemented in hardware, or a combination of hardware with firmware and/or software provided by computer system 400.

Figure 5:
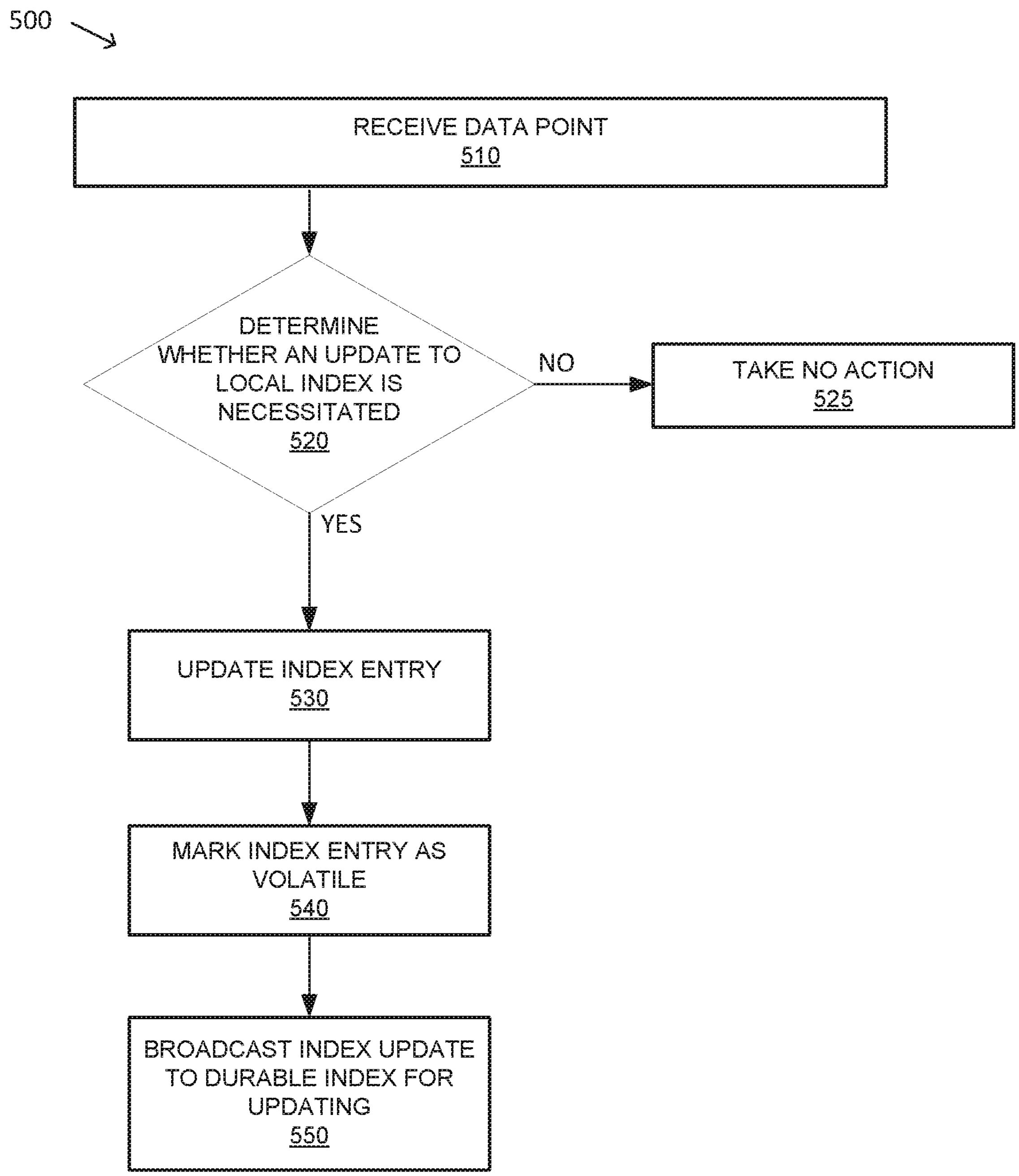
FIGS. 5 and 6 depict flow diagrams for handling of an index update at ingestion of a data point, according to various embodiments.

FIG. 5 depicts a flow diagram 500 for handling of an index update at ingestion of a data point, according to an embodiment. At procedure 510 of flow diagram 500, a data point is received at an ingestion node of a time series data monitoring system. At procedure 520, it is determined whether an update to a local index of the ingestion node is necessitated based on the data point and the local index.

Provided an update to the local index is not necessitated, as shown at procedure 525, no action is taken. Provide an update to the local index is necessitated, as shown at procedure 530, an index entry corresponding to the data point in the local index is updated based on the data point. At procedure 540, the index entry corresponding to the data point is marked with a volatile indicator, the volatile indicator indicating that receipt of an index update to a corresponding index entry at a durable index of the time series data monitoring system is unconfirmed. At procedure 550, the index update to the durable index corresponding to the data point is initiated.

Figure 6:
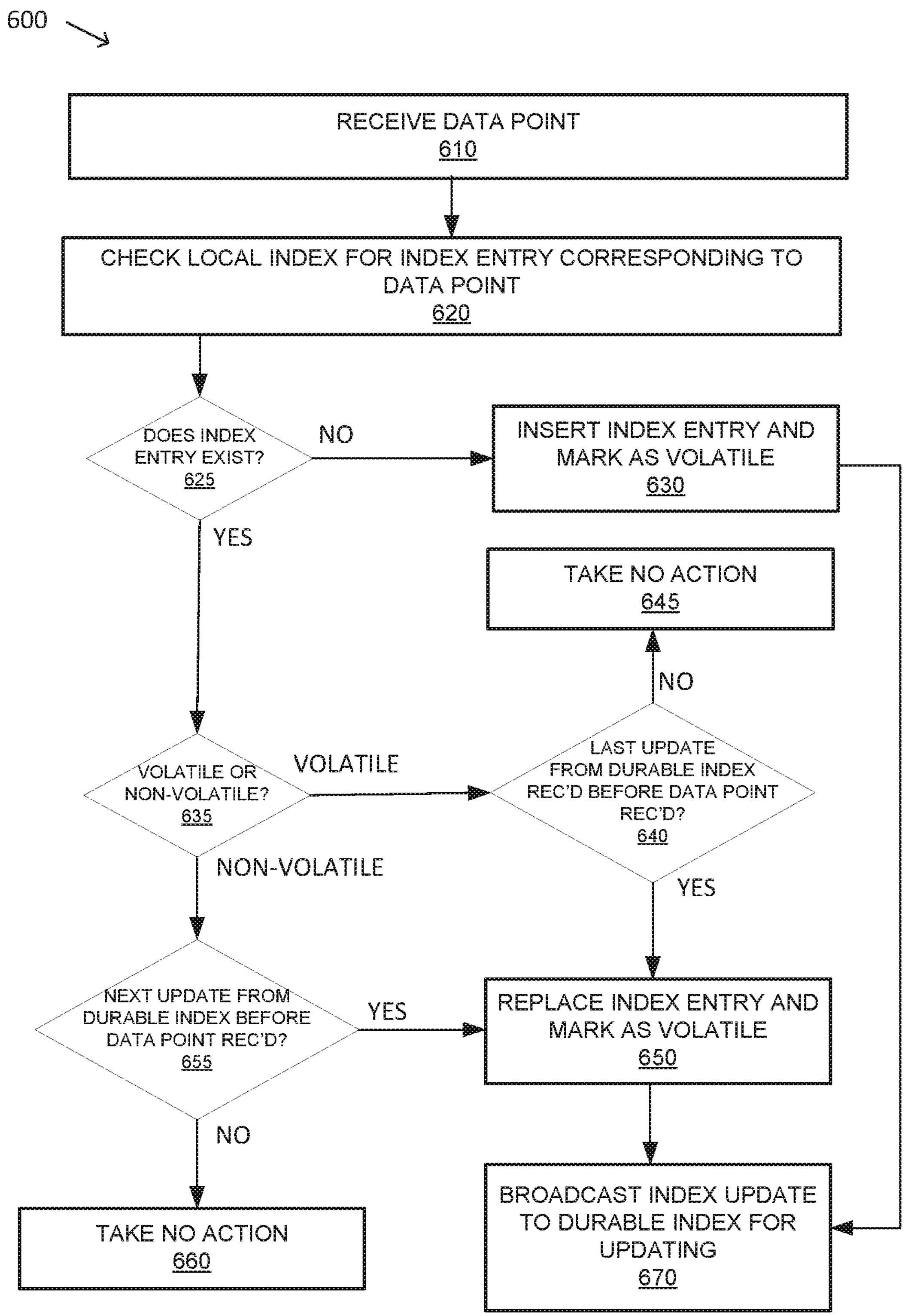

FIG. 6 depicts a flow diagram 600 for handling of an index update at ingestion of a data point, according to another embodiment. At procedure 610 of flow diagram 600, a data point is received at an ingestion node of a time series data monitoring system. At procedure 620, the local index of the ingestion node is checked for an index entry corresponding to the data point.

At procedure 625, it is determined whether the index entry corresponding to the data point exists in the local index. Provided the index entry corresponding to the data point does not exist in the local index, as shown at procedure 630, it is determined that an update to the local index is necessitated. The index entry corresponding to the data point is created, inserted into the local index, and marked as volatile. Flow diagram 600 then proceeds to procedure 670. Provided the index entry corresponding to the data point does not exist in the local index, flow diagram 600 then proceeds to procedure 635.

At procedure 635, it is determined whether the index entry corresponding to the data point is marked as volatile or non-volatile within the local index. Provided the index entry corresponding to the data point is marked as volatile, flow diagram 600 then proceeds to procedure 640. Provided the index entry corresponding to the data point is marked as non-volatile, flow diagram 600 then proceeds to procedure 655.

At procedure 640, it is determined whether the last (e.g., most recent prior) update of the local index from the durable index is before the time of receipt of the data point. Provided the last update of the local index from the durable index was not before the time of receipt of the data point, as shown at procedure 645, no action is taken. Provided the last update of the local index from the durable index was before the time of receipt of the data point, as shown at procedure 650, the index entry of the local index is replaced with the index entry corresponding to the data point and the index entry is marked as volatile.

At procedure 655, it is determined whether the next (e.g., next scheduled) update of the local index from the durable index is before the time of receipt of the data point. Provided the next update of the local index from the durable index is not before the time of receipt of the data point, as shown at procedure 660, no action is taken. Provided the next update of the local index from the durable index is before the time of receipt of the data point, as shown at procedure 650, the index entry of the local index is replaced with the index entry corresponding to the data point and the index entry is marked as volatile.

At procedure 670, the index update is broadcast to the durable index for updating.

Figure 7:
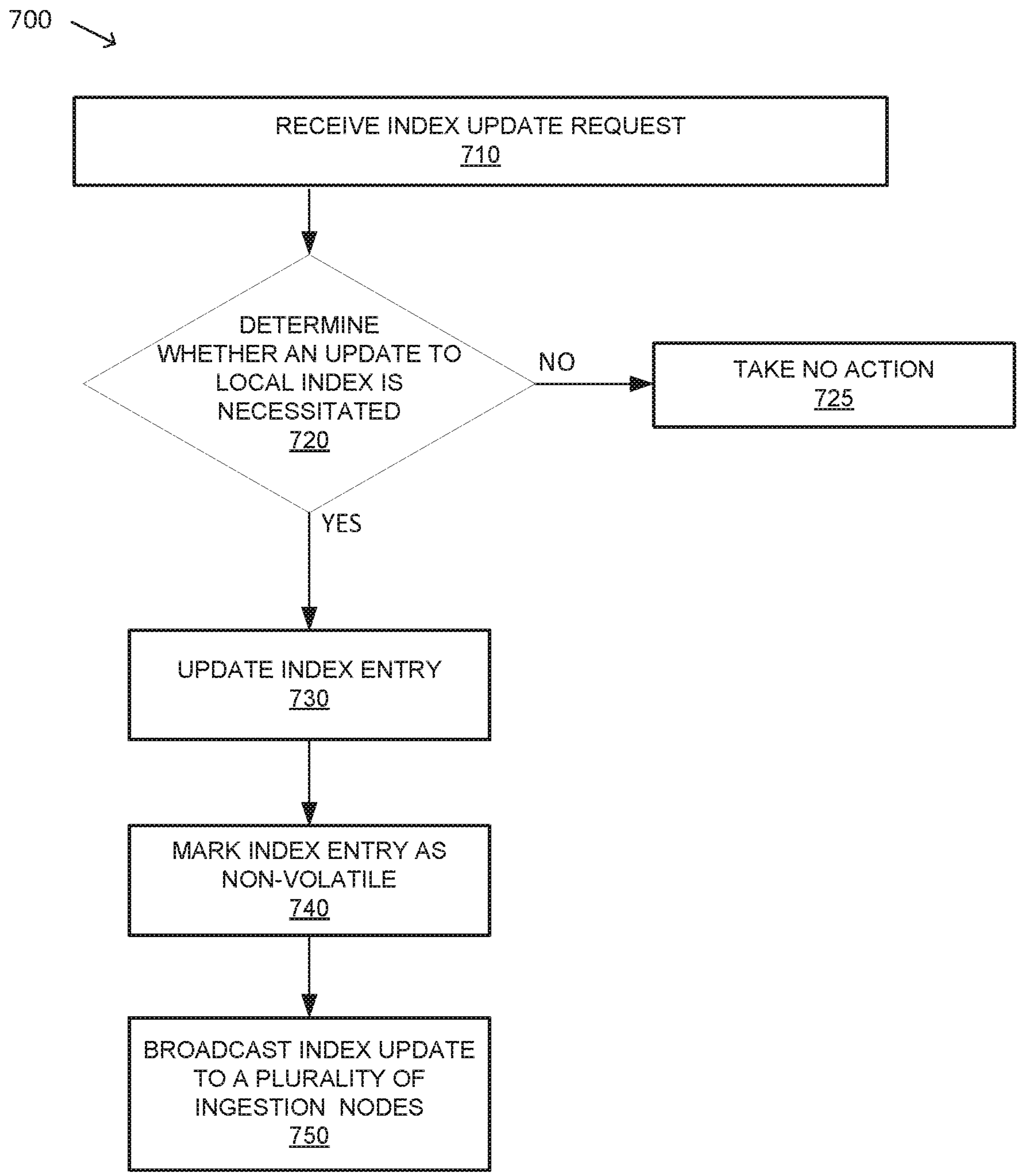
FIGS. 7 and 8 depict flow diagrams for handling of an index update responsive to an index update request, according to various embodiments.

FIG. 7 depicts a flow diagram 700 for handling of an index update responsive to an index update request received at the ingestion node, according to an embodiment. At procedure 710 of flow diagram 700, an index update request is received at an ingestion node of a time series data monitoring system. At procedure 720, it is determined whether an update to a local index of the ingestion node is necessitated based on the index update request and the local index.

Provided an update to the local index is not necessitated, as shown at procedure 725, no action is taken. Provide an update to the local index is necessitated, as shown at procedure 730, an index entry corresponding to the index update request in the local index is updated based on the index update request. At procedure 740, the index entry corresponding to the index update request is marked with a non-volatile indicator, the non-volatile indicator indicating that receipt of an index update to a corresponding index entry at a durable index of the time series data monitoring system is confirmed. In one embodiment, as shown at procedure 750, the index update is broadcast to a plurality of ingestion nodes.

Figure 8:
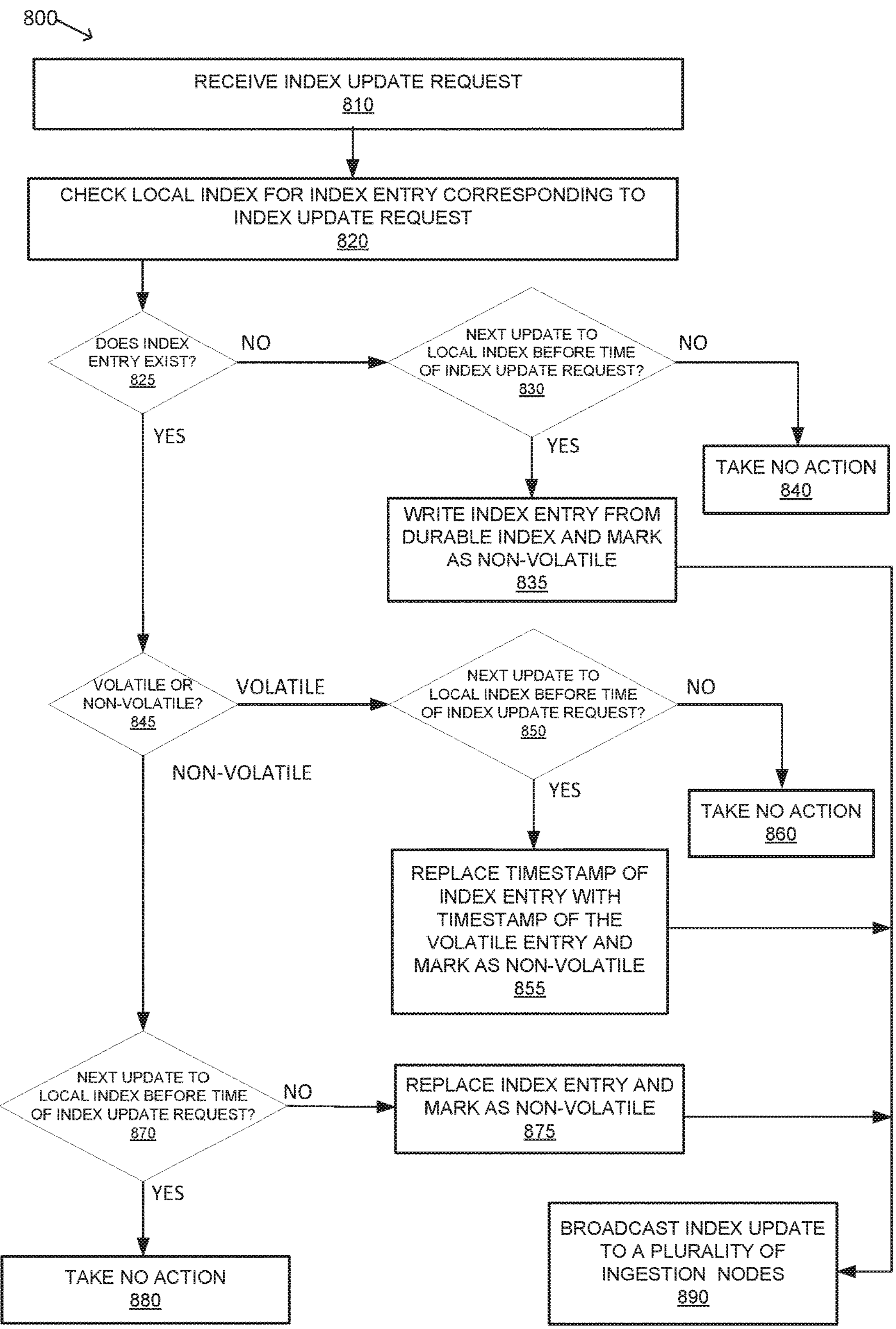

FIG. 8 depicts a flow diagram 800 for handling of an index update responsive to an index update request received at the ingestion node, according to another embodiment. At procedure 810 of flow diagram 800, an index update request is received at an ingestion node of a time series data monitoring system. At procedure 820, the local index of the ingestion node is checked for an index entry corresponding to the index update request.

At procedure 825, it is determined whether the index entry corresponding to the index update request exists in the local index. Provided the index entry corresponding to the index update request does not exist in the local index, as shown at procedure 830, it is determined whether the next (e.g., next scheduled) update of the local index from the durable index is before the time of receipt of the index update request. Provided the next update of the local index from the durable index is not before the time of receipt of the index update request, as shown at procedure 840, no action is taken. Provided the next update of the local index from the durable index is before the time of receipt of the index update request, as shown at procedure 835, the index entry is read from the durable index, written to the local index, and marked as non-volatile. Flow diagram 800 then proceeds to procedure 890.

With reference to procedure 825, provided the index entry corresponding to the index update request does exist in the local index, flow diagram 800 then proceeds to procedure 845. At procedure 845, it is determined whether the index entry corresponding to the index update request is marked as volatile or non-volatile within the local index.

Provided the index entry corresponding to the index update request is marked as volatile, flow diagram 800 then proceeds to procedure 850. Provided the index entry corresponding to the index update request is marked as non-volatile, flow diagram 800 then proceeds to procedure 870.

At procedure 850, it is determined whether the next (e.g., next scheduled) update of the local index from the durable index is before the time of receipt of the index update request. Provided the next update of the local index from the durable index is not before the time of receipt of the index update request, as shown at procedure 860, no action is taken. Provided the next update of the local index from the durable index is before the time of receipt of the index update request, as shown at procedure 855, the index entry is read from the durable index. The timestamp of the index entry is replaced with the timestamp of the volatile index entry, written to the local index, and marked as non-volatile. Flow diagram 800 then proceeds to procedure 890.

At procedure 870, it is determined whether the next (e.g., next scheduled) update of the local index from the durable index is before the time of receipt of the index update request. Provided the next update of the local index from the durable index is not before the time of receipt of the index update request, as shown at procedure 880, no action is taken. Provided the next update of the local index from the durable index is before the time of receipt of the index update request, as shown at procedure 875, the index entry of the local index is replaced with the index entry corresponding to the index update request and the index entry is marked as volatile. Flow diagram 800 then proceeds to procedure 890.

At procedure 890, the index update is broadcast to a plurality of ingestion nodes.

It is noted that any of the procedures, stated above, regarding the flow diagrams of FIGS. 5 through 8 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for handling index updates, the method comprising:

receiving a data point at an ingestion node of a plurality of ingestion nodes of a time series data monitoring system;

determining whether an update to a local index of the ingestion node is necessitated based on the data point and the local index;

provided the update to the local index is necessitated:

updating an index entry of the local index corresponding to the data point and based on the data point;

marking the index entry of the local index corresponding to the data point with a volatile indicator, the volatile indicator indicating that receipt of an index update to a corresponding index entry at a durable index of the time series data monitoring system is unconfirmed; and initiating the index update to the durable index corresponding to the data point by placing the index update in a messaging queue for updating the durable index.

2. The method of claim 1, wherein the determining whether an update to a local index of the ingestion node is necessitated based on the data point comprises:

provided the local index does not comprise an existing index entry corresponding to the data point, determining that the update to the local index is necessitated.

3. The method of claim 2, wherein the updating the index entry corresponding to the data point in the local index based on the data point comprises:

creating the index entry corresponding to the data point; and inserting the index entry corresponding to the data point into the local index.

4. The method of claim 1, wherein the determining whether an update to a local index of the ingestion node is necessitated based on the data point comprises:

provided the local index comprises an existing index entry corresponding to the data point and the existing index entry corresponding to the data point comprises the volatile indicator, determining an immediately prior update time of the local index from the durable index; and provided the immediately prior update time of the local index from the durable index is before a receipt time of the data point, determining that the update to the local index is necessitated.

5. The method of claim 4, wherein the updating the index entry corresponding to the data point in the local index based on the data point comprises:

replacing the existing index entry corresponding to the data point in the local index with the index entry corresponding to the data point.

6. The method of claim 1, wherein the determining whether an update to a local index of the ingestion node is necessitated based on the data point comprises:

provided the local index comprises an existing index entry corresponding to the data point and the existing index entry corresponding to the data point comprises a non-volatile indicator, the non-volatile indicator indicating that receipt of the corresponding index entry at the durable index is confirmed, determining a next update time of the local index from the durable index; and provided the next update time of the local index from the durable index is before a receipt time of the data point, determining that the update to the local index is necessitated.

7. The method of claim 6, wherein the updating the index entry corresponding to the data point in the local index based on the data point comprises:

replacing the existing index entry corresponding to the data point in the local index with the index entry corresponding to the data point.

8. The method of claim 1, wherein the volatile indicator is comprised within a least significant bit of a timestamp of the index entry.

9. The method of claim 1, further comprising:

receiving an index update request for updating the local index of the ingestion node;

determining whether a second update to the local index is necessitated based on the index update request and the local index;

provided the second update to the local index is necessitated:

updating an index entry identified by the index update request in the local index; and marking the index entry identified by the index update request with a non-volatile indicator, the non-volatile indicator indicating that the durable index of the time series data monitoring system comprises an index entry matching the index entry identified by the index update request.

10. A method for handling index update requests, the method comprising:

receiving an index update request for updating a local index of an ingestion node of a plurality of ingestion nodes of a time series data monitoring system from a durable index of the time series data monitoring system;

determining whether an update to the local index is necessitated based on the index update request and the local index;

provided the update to the local index is necessitated:

updating an index entry of the local index identified by the index update request;

marking the index entry of the local index identified by the index update request with a non-volatile indicator, the non-volatile indicator indicating that the durable index of the time series data monitoring system comprises an index entry matching the index entry identified by the index update request; and responsive to the updating the index entry identified by the index update request in the local index, broadcasting the index entry comprising the non-volatile indicator to the plurality of ingestion nodes of the time series data monitoring system.

11. The method of claim 10, wherein the determining whether the update to the local index is necessitated based on the index update request comprises:

provided the local index does not comprise an existing index entry corresponding to the index entry identified by the index update request, determining an immediately prior update time of the local index from the durable index; and provided the immediately prior update time of the local index from the durable index is before a receipt time of the index update request, determining that the update to the local index is necessitated.

12. The method of claim 11, wherein the updating the index entry identified by the index update request in the local index comprises:

reading the index entry from the durable index matching the index entry identified by the index update request; and inserting the index entry from the durable index matching the index entry identified by the index update request into the local index.

13. The method of claim 10, wherein the determining whether the update to the local index is necessitated based on the index update request comprises:

provided the local index comprises an existing index entry corresponding to the index entry identified by the index update request and the existing index entry corresponding to the index entry identified by the index update request does not comprise the non-volatile indicator, determining an immediately prior update time of the local index from the durable index; and provided the immediately prior update time of the local index from the durable index is before a receipt time of the index update request, determining that the update to the local index is necessitated.

14. The method of claim 13, wherein the updating the index entry identified by the index update request in the local index comprises:

reading the index entry from the durable index matching the index entry identified by the index update request;

updating the index entry from the durable index matching the index entry identified by the index update request with a timestamp of the existing index entry; and replacing the existing index entry with the index entry from the durable index matching the index entry identified by the index update request, the index entry comprising the timestamp of the existing index entry.

15. The method of claim 10, wherein the determining whether the update to the local index is necessitated based on the index update request comprises:

provided the local index comprises an existing index entry corresponding to the index entry identified by the index update request and the existing index entry corresponding to the index entry identified by the index update request comprises the non-volatile indicator, determining an immediately prior update time of the local index from the durable index; and provided the immediately prior update time of the local index from the durable index is not before a receipt time of the index update request, determining that the update to the local index is necessitated.

16. The method of claim 15, wherein the updating the index entry identified by the index update request in the local index comprises:

reading the index entry from the durable index matching the index entry identified by the index update request; and replacing the existing index entry with the index entry from the durable index matching the index entry identified by the index update request.

17. The method of claim 10, wherein the non-volatile indicator is comprised within a least significant bit of a timestamp of the index entry.

18. A time series data monitoring system for handling index updates of time series data, the time series data monitoring system comprising:

a plurality of ingestion nodes, each ingestion node of the plurality of ingestion nodes comprising a data storage unit and a processor communicatively coupled with the data storage unit, an ingestion node of the plurality of ingestion nodes is configured to:

receive a data point at an ingestion node of a plurality of ingestion nodes of a time series data monitoring system;

determine whether an update to a local index of the ingestion node is necessitated based on the data point and the local index;

provided the update to the local index is necessitated:

update an index entry of the local index corresponding to the data point and based on the data point;

mark the index entry of the local index corresponding to the data point with a volatile indicator, the volatile indicator indicating that receipt of an index update to a corresponding index entry at a durable index of the time series data monitoring system is unconfirmed; and initiate the index update to the durable index corresponding to the data point by placing the index update in a messaging queue for updating the durable index.

19. The time series data monitoring system of claim 18, wherein the ingestion node of the plurality of ingestion nodes is further configured to:

receive an index update request for updating the local index of the ingestion node;

determine whether a second update to the local index is necessitated based on the index update request and the local index;

provided the second update to the local index is necessitated:

update an index entry identified by the index update request in the local index; and mark the index entry identified by the index update request with a non-volatile indicator, the non-volatile indicator indicating that the durable index of the time series data monitoring system comprises an index entry matching the index entry identified by the index update request.

* * * * *